(12) United States Patent
Fuhr et al.

(10) Patent No.: US 9,214,074 B1
(45) Date of Patent: Dec. 15, 2015

(54) VIDEO MONITORING SYSTEM FOR A PATH

(75) Inventors: Jaclyn Fuhr, Minneapolis, MN (US); Neal DePape, Minneapolis, MN (US); Jacob Schneider, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 2224 days.

(21) Appl. No.: 12/201,903

(22) Filed: Aug. 29, 2008

(51) Int. Cl.
H04N 7/18 (2006.01)
G08B 13/196 (2006.01)

(52) U.S. Cl.
CPC .......... *G08B 13/19645* (2013.01); *H04N 7/181* (2013.01)

(58) Field of Classification Search
CPC .......................... G08B 13/19645; H04N 7/181
USPC ......................................................... 348/159
See application file for complete search history.

(56) References Cited

U.S. PATENT DOCUMENTS

| | | | |
|---|---|---|---|
| 4,120,004 A | 10/1978 | Coutta | |
| 5,920,261 A | 7/1999 | Hughes et al. | |
| 5,969,755 A | 10/1999 | Courtney | |
| 6,424,370 B1 | 7/2002 | Courtney | |
| 6,662,068 B1 | 12/2003 | Ghaffari | |
| 6,804,578 B1 | 10/2004 | Ghaffari | |
| 6,909,356 B2 | 6/2005 | Brown et al. | |
| 7,167,576 B2 | 1/2007 | Steenburgh et al. | |
| 7,168,618 B2 | 1/2007 | Schwartz | |
| 2004/0061781 A1* | 4/2004 | Fennell | G08B 13/19602 348/169 |
| 2004/0111454 A1* | 6/2004 | Sorensen | 708/200 |
| 2004/0252194 A1* | 12/2004 | Lin | H04N 7/181 348/169 |
| 2006/0149566 A1 | 7/2006 | Lin | |
| 2007/0013776 A1 | 1/2007 | Venetianer et al. | |
| 2007/0165931 A1* | 7/2007 | Higaki | 382/128 |
| 2007/0182818 A1 | 8/2007 | Buehler | |
| 2007/0229272 A1* | 10/2007 | Cash et al. | 340/572.1 |
| 2007/0291117 A1* | 12/2007 | Velipasalar | G08B 13/19615 348/152 |
| 2008/0074496 A1 | 3/2008 | Venetianer et al. | |
| 2008/0246613 A1* | 10/2008 | Linstrom et al. | 340/572.4 |
| 2009/0091452 A1* | 4/2009 | Himmel | 340/572.1 |

* cited by examiner

*Primary Examiner* — Kevin Mai
(74) *Attorney, Agent, or Firm* — Merek, Blackmon & Voorhees, LLC

(57) ABSTRACT

A number of monitoring devices are directed at a path. A controller is electrically coupled to the number of monitoring devices. The controller may be configured to cause video captured by each of the number of monitoring devices to be displayed and/or stored in response to determining that an image of a carrier that was previously present in an image field captured by a first monitoring device of the plurality of monitoring devices that is directed at a starting location of the path is absent from image field captured by the first monitoring device. Alternatively, the controller may be configured to determine whether the carrier travels between successive locations of the path within a certain length of time and to indicate a timing violation when the carrier fails to travel between the successive locations of the path within the certain length of time.

3 Claims, 4 Drawing Sheets

VIDEO MONITORING SYSTEM FOR A PATH

FIELD

The present disclosure relates generally to monitoring, and in particular, the present disclosure relates to a monitoring system for a path, such as a path through a facility, e.g., a retail store or the like.

BACKGROUND

Retail stores are common targets of theft. For example, small, high-priced items, such as small electronics, jewelry, etc., are particularly susceptible to theft during stocking of these items. To help combat theft of small, high-priced items, these items are often kept in their own stockroom that is locked, except during times when the items are being removed for stocking. However, thefts can occur when the items are being transported from the stockroom to their display locations. For example, an item may be hidden within the store, somewhere between the stockroom and the display location, for retrieval at a later time.

For the reasons stated above, and for other reasons stated below which will become apparent to those skilled in the art upon reading and understanding the present specification, there is a need in the art for alternative theft prevention and apprehension methods.

SUMMARY

One embodiment of the present invention provides a monitoring system that includes a plurality of monitoring devices directed at a path. A controller is electrically coupled to the plurality of monitoring devices. The controller may be configured to cause video captured by each of the plurality of monitoring devices to be displayed and/or stored in response to determining that an image of a carrier that was previously present in an image field captured by a first monitoring device of the plurality of monitoring devices that is directed at a starting location of the path is absent from image field captured by the first monitoring device. Alternatively, the controller may be configured to determine whether the carrier travels between successive locations of the path within a certain length of time and to indicate a timing violation when the carrier fails to travel between the successive locations of the path within the certain length of time.

DETAILED DESCRIPTION

Figure 1:
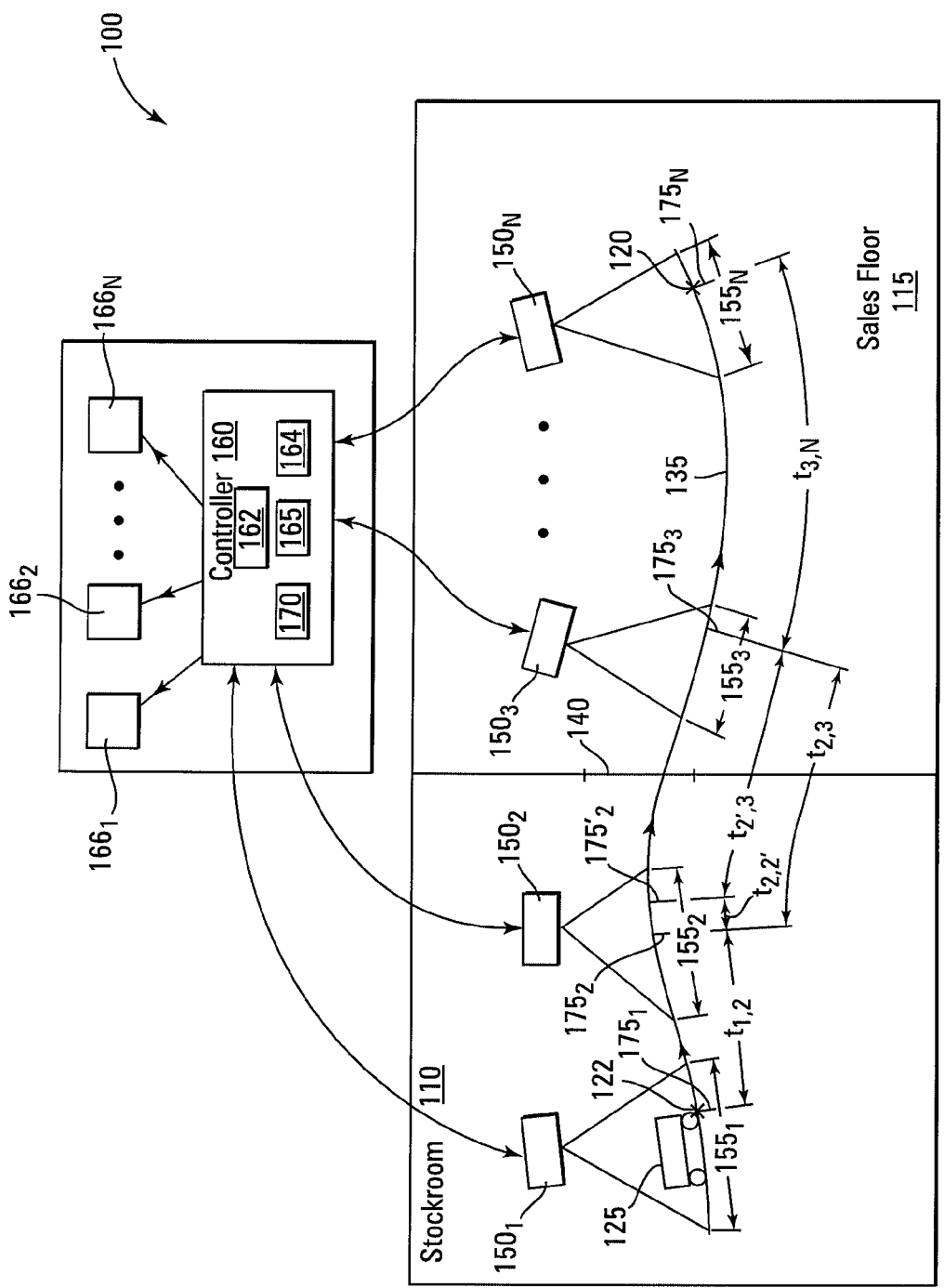
FIG. 1 illustrates a portion of a facility, according to an embodiment of the invention.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. It is to be understood that other embodiments may be utilized and that process, electrical, and/or mechanical changes may be made without departing from the scope of the claimed subject matter. The following detailed description is, therefore, not to be taken in a limiting sense, and the scope of the present disclosure is defined only by the appended claims and equivalents thereof.

FIG. 1 illustrates a portion of a facility, such as a retail store 100, according to an embodiment. Retail store 100 may include a stockroom 110, e.g., specifically for small, high-priced items, such as small electronics, jewelry, etc., and a sales floor 115. Sales floor 115 includes a certain (e.g., predetermined) location 120, such as a display location for displaying the small, high-priced items from stockroom 110. For one embodiment, stockroom 110 may include a certain location 122 at which a certain carrier (e.g., a conveyance) 125 may be loaded with items for transporting the items from location 122 to location 120. Non-limiting examples of a carrier include a cart, e.g., a shopping cart, a pallet on wheels, a forklift carrying a pallet, a box, basket, or pallet that is carried by one or more individuals, a wagon, a "hand truck," a "hand truck" carrying a pallet, or any other vehicle capable of carrying items from one location to another.

For one embodiment, a certain (e.g., predetermined) path 135 extends between location 122 of stockroom 110 and location 120 of sales floor 115. For example, path 135 describes a specific route to be taken by employees of retail store 100 when conveying items from location 122 in stockroom 110 to location 120 of sales floor 115 at certain times of day, e.g., when retail store 100 is closed, such as between 5:00 a.m. and 6:00 a.m., for stocking location 120 with these items. That is, path 135 is specifically selected for conveying certain items, e.g., small, high-priced items, such as small electronics, jewelry, etc., from location 122 in stockroom 110 to location 120, where location 122 is the starting location and location 120 is the ending location of path 135. For one embodiment, the length of path 135 corresponds to the shortest distance between locations 120 and 122. For another embodiment, stockroom 110 and sales floor 115 are in selective communication with each other via a door 140 that selectively opens and closes a doorway through which path 135 passes.

For one embodiment, carrier 125 is used specifically for conveying the items from location 122 in stockroom 110 to location 120. Motion may be imparted to carrier 125 by an employee of the retail store who will be stocking location 120 with items from carrier 125. For other embodiments, carrier 125 may be motorized. For example, carrier 125 may be a forklift for carrying a pallet that contains the items for location 120.

For one embodiment, monitoring devices, such as cameras $150_1$ to $150_N$, e.g., analog or digital video cameras, are respectively directed at certain (e.g., predetermined) portions, e.g., path segments $155_1$ to $155_N$, of path 135. For example, in one embodiment, cameras $150_1$ to $150_N$ correspond to segments $155_1$ to $155_N$ on a one-to-one basis, where path segment $155_1$ includes location 122 and path segment $155_N$ includes location 120. During operation, cameras $150_1$ to $150_N$ respectively capture images, e.g., analog or digital images, of path segments $155_1$ to $155_N$. For another embodiment, cameras $150_1$ to $150_N$ are specifically intended for taking video, e.g., analog or digital video, of path segments $155_1$ to $155_N$ during certain (e.g., predetermined) times of day, e.g., corresponding to the stocking times for location 120, such as when the retail store is closed. For one embodiment, a portion of retail store 100 that includes path 135 and cameras $150_1$ to $150_N$ is a certain zone of the retail store, such as a security zone.

Cameras 150 are electrically coupled to a controller 160 to form a monitoring system, such as a video monitoring system, for monitoring the movement of carrier 125 along path 135. For one embodiment, the video monitoring system is specifically dedicated to monitoring path 135. For another embodiment, the video monitoring system is a general video monitoring system with cameras for monitoring the entire facility, including cameras 150 for monitoring path 135. Controller 160 and cameras 150 may be coupled to each other over a network, such as local area network (LAN). For one embodiment, controller 160 may provide an interface for a user to interact with cameras 150. For another embodiment, controller 160 may be a computer, such as personal computer, e.g., with a video display 162. Controller 160 may also include a keyboard (not shown) for inputting information into controller 160 and a pointing device (not shown), such as a "mouse," for controlling a cursor displayed on video display 162.

For one embodiment, controller 160 includes a processor 164 for processing computer-readable instructions. These computer-readable instructions are stored in a memory 165, such as a computer-usable media, and may be in the form of software, firmware, or hardware. The computer-readable instructions configure controller 160 to cause the video monitoring system to perform the operations and methods described below.

In a hardware solution, the computer-readable instructions are hard coded as part of processor 164, e.g., an application-specific integrated circuit (ASIC) chip. In a software or firmware solution, the instructions are stored for retrieval by the processor 164. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD). For another embodiment, controller 160 may include a storage device 170, such as a hard drive, removable flash memory, etc., for storing image data corresponding to video images captured by cameras $150_1$ to $150_N$.

For one embodiment, controller 160 may be electrically coupled to video monitors $166_1$ to $166_N$, where video monitors $166_1$ to $166_N$ are configured to display video respectively received from cameras $150_1$ to $150_N$. For example, controller 160 may be configured to respectively direct video from cameras $150_1$ to $150_N$ to video monitors $166_1$ to $166_N$. For embodiments where controller 160 includes video display 162, video from cameras $150_1$ to $150_N$ may be respectively displayed in "windows" displayed on video display 162.

For one embodiment, controller 160 may be configured to cause the video captured by each of cameras $150_1$ to $150_N$ to be displayed on respective ones of video monitors $166_1$ to $166_N$ or on video display 162 in response to carrier 125 leaving the segment of path 135 (e.g., path segment $155_1$) that includes location 122 in stockroom 110. For example, when controller 160 detects that an image of carrier 125 no longer appears in the image of path segment $155_1$, i.e., in the image field captured by camera $150_1$ that contains the image of path segment $155_1$, controller 160 causes the video from each of cameras $150_1$ to $150_N$ along path 135 to be displayed.

For one embodiment, controller 160 determines that the image of carrier 125 no longer appears in the image field captured by camera $150_1$ when the image of carrier 125 has been absent from that image field for a certain (e.g., predetermined) length of time, e.g., about five seconds. For another embodiment, controller 160 may be configured to cause image data corresponding to the images captured by each of cameras $150_1$ to $150_N$ to be stored, e.g., as an image data file in a video image database, such as in storage device 170, in response to detecting that the image of carrier 125 no longer appears in the image field captured by camera $150_1$. For one embodiment, controller 160 is configured to activate cameras $150_2$ to $150_N$ in response to controller 160 determining that an image of carrier 125 no longer appears in the image field captured by camera $150_1$ before displaying and/or storing image data from each of cameras $150_1$ to $150_N$. Displaying video and/or storing image data from each of cameras $150_1$ to $150_N$ enables tracking of carrier 125 as carrier 125 traverses path 135.

For one embodiment, detecting that the image of carrier 125 no longer appears in the image field captured by camera $150_1$ includes determining that a certain object (e.g., corresponding to carrier 125), e.g., of a certain (e.g., predetermined) size, that resided in the image field captured by camera $150_1$ has been absent from that image field for a certain length of time, e.g., about five seconds. For one embodiment, controller 160 may be configured to determine the size, such as the area, of an interior of a geometrical object, such as a box, formed around the image of carrier 125 in the image field captured by camera $150_1$ by the user. The user may then store the size of the interior of the geometrical object as the certain size, e.g., in storage device 170. Then, each time an object has been absent from the image field captured by camera $150_1$, e.g., for the certain length of time, controller 160 compares the size of that object to the certain size.

When the size of the object matches the certain size, controller 160 determines that the image of carrier 125 has left the image field captured by camera $150_1$ and thus carrier 125 has left path segment $155_1$, and, consequently, controller 160 causes video from each of cameras $150_1$ to $150_N$ to be displayed and/or stored. Otherwise, e.g., when the size of the object that left the image field captured by camera $150_1$ is different from, e.g., larger or smaller than, the certain size, controller 160 will not cause the video from each of cameras $150_1$ to $150_N$ to be displayed and/or stored, and for some embodiments, cameras $150_2$ to $150_N$ will not be activated. In this way, objects entering and exiting the image field captured by camera $150_1$, by entering and exiting path segment $155_1$, whose sizes are different than that of carrier 125, meaning these objects are not carrier 125, will be ignored. Note that in one embodiment, controller 160 uniquely identifies an object whose image is captured by camera $150_1$ as carrier 125 when the size of that object matches the certain size.

For one embodiment, controller 160, and thus the monitoring system, is configured to operate in a certain mode, such as a path-monitoring mode, e.g., a security-zone-monitoring mode, during certain times of day, e.g., corresponding to the stocking times for location 120. For example, controller 160 may be configured to detect that the image of carrier 125 no longer appears in the image of path segment $155_1$ only when the monitoring system is operating in the security-zone-monitoring mode, e.g., during the certain times of day.

For another embodiment, controller 160 may be configured to time the progress of carrier 125 along path 135 only during the certain times of day. That is, controller 160 may be configured to determine whether carrier 125 travels between successive segments 155 within a certain time. For example, controller 160 may determine whether carrier 125 travels between successive locations 175, e.g., timing locations, respectively located within successive segments 155. That is, for one embodiment, there is one location 175 within each segment 155. Alternatively, there may be one or more additional timing locations 175 located in one or more of the segments 155, in which case the one or more additional timing locations 175 are also included in the timing.

For one embodiment, controller 160 may be configured to determine the length of time it takes for carrier 125 to travel between the locations 175 within successive segments 155 and to compare that time to a certain (e.g., predetermined) length of time based on the distance between the certain locations within the successive segments 155. For example, the length of time it takes for carrier 125 to travel from a certain location $175_1$, e.g., that coincides with starting location 122 in stockroom 110, within segment $155_1$ to a certain location $175_2$ within segment $155_2$ may be determined and compared to a first certain length of time $t_{1,2}$ (FIG. 1) that is determined based on the distance between certain location $175_1$ and certain location $175_2$ and the speed of carrier 125. Similarly, the length of time it takes for carrier 125 to travel from the certain location $175_2$ to a certain location $175_3$ within segment $155_3$ may be determined and compared to a second certain length of time $t_{2,3}$ (FIG. 1) that is determined based on the distance between certain location $175_2$ and certain location $175_3$ and the speed of carrier 125. The length of time it takes for carrier 125 to travel from the certain location $175_3$ to a certain location $175_N$, e.g., that coincides with end location 120 on sales floor 115, within segment $155_N$ may also be determined and compared to an (N−1)th certain length of time $t_{3,N}$ (FIG. 1) that is determined based on the distance between certain location $175_3$ and certain location $175_N$ and the speed of carrier 125. For one embodiment, controller 160 is configured to perform the timing only during certain times of day, e.g., corresponding to the stocking times for location 120.

For an alternative embodiment, when carrier 125 arrives at location $175_2$ within segment $155_2$ within the length of time $t_{1,2}$, controller 160 may be further configured to determine whether carrier 125 travels from location $175_2$ to location $175_2'$ within segment $155_2$ within a certain intermediate length of time $t_{2,2'}$ (FIG. 1) that is determined based on the distance between location $175_2$ and location $175_2'$ and the speed of carrier 125. For example, for another embodiment, the length of time it takes for carrier 125 to travel from location $175_2$ to location $175_2'$ may be determined and compared to the length of time $t_{2,2'}$. Controller 160 may then determine whether carrier 125 travels from location $175_2'$ to location $175_3$ within a certain length of time $t_{2',3}$ (FIG. 1) that is determined based on the distance between location $175_2'$ and location $175_3$ and the speed of carrier 125. For example, for one embodiment, the length of time it takes for carrier 125 to travel from location $175_2'$ to location $175_3$ may be determined and compared to the length of time length of time $t_{2',3}$. Controller 160 may then determine whether carrier 125 travels from location $175_3$ to location $175_N$ within the length of time $t_{3,N}$, as described above. Note that timing between successive locations within a segment 155, as described and shown for segment $155_2$, may occur for other segments 155 along path 155 for embodiments where those segments, including segments $155_1$, $155_3$, and $155_N$, include one or more additional timing locations.

For one embodiment, controller 160, and thus the monitoring system, may be configured to operate in a normal mode of operation, where controller 160 causes cameras 150 to capture video or to capture and display video or to record and store video, and to transition to the security-zone-monitoring mode of operation in response to a certain event, such as the occurrence of a certain time of day corresponding to one of the stocking times for location 120. For another embodiment, the monitoring system may be configured to transition from the normal operating mode to a timing mode of operation in response to the certain event and to transition to the security-zone-monitoring mode in response to a certain other event, such as when carrier 125 arrives at a certain location of path 135 within a certain time. For example, the monitoring system may transition from the timing mode to the security-zone-monitoring mode in response to carrier 125 arriving at location $175_2'$ from location $175_1$ without any timing violations, when location $175_2'$ is included in segment $155_2$, or carrier 125 arriving at location $175_3$ from location $175_1$ without any timing violations when location $175_2'$ is not included in segment $155_2$.

For one embodiment, when operating in the timing mode, the monitoring system records and stores video and times the progress of carrier 125 along path 135. For example, controller 160 determines whether carrier 125 travels between successive path locations 175 within a certain time. For one embodiment, controller 160 may be configured to indicate an occurrence of a timing violation whenever a timing violation occurs when operating in the timing mode. For example, when operating in the timing mode, controller 160 may indicate, e.g., on video display 162, that a timing violation occurred in the form of an informational message, e.g., informing a user that a timing violation occurred. The message may include the location of the camera that last captured an image of carrier 125 just prior to or at the time of the timing violation and the time at which the timing violation occurred. For one embodiment, when operating in the timing mode, controller 160 may treat a timing violation as a false alarm by indicating that a false alarm occurred. For another embodiment, controller 160 exits the timing mode and returns to the normal mode of operation in response to a timing violation.

For one embodiment, when operating in the security-zone-monitoring mode, the monitoring system records and stores video and times the progress of carrier 125 along path 135. For example, controller 160 determines whether carrier 125 travels between successive path locations 175 within a certain time. For one embodiment, controller 160 may be configured to indicate an occurrence of a timing violation whenever a timing violation occurs when operating in the security-zone-monitoring mode. For another embodiment, controller 160 may be configured to indicate a timing violation in the form of an alarm, such as a path-violation alarm, only while operating in the security-zone-monitoring mode. For example, a path-violation alarm may be indicated in conjunction with the timing violation only while operating in the security-zone-monitoring mode. For another embodiment, controller 160 exits the security-zone-monitoring mode and returns to the normal mode of operation in response to a timing violation and thus a path-violation alarm.

For another embodiment, controller 160 may stop the timing of carrier 125 in response to any timing violation, regardless of whether controller 160 is operating in the timing mode or security-zone-monitoring mode. For example, controller 160 may exit the security-zone-monitoring mode or the timing mode in response to a timing violation and enter the normal operating mode. For one embodiment, cameras 150 may record and store video all the time, but it is only during the security-zone-monitoring mode and the timing mode that controller 160 times the progress of carrier 125 along path 135 or determines when carrier 125 has left location 122, as described above. For another embodiment, it is only while operating in the security-zone-monitoring mode that path-violation alarms are issued for a timing violation.

For another embodiment, controller 160 may be configured to indicate a path-violation alarm, e.g., in the form of a message displayed on video display 162 or displayed and/or stored as part of an alarm log. That is, when the length of time it takes for carrier 125 to travel between certain locations within successive segments 155 exceeds the certain length of time based on the distance between those certain locations or the time it takes for carrier 125 to travel between certain locations within a single segment 155, a timing violation occurs. For example, when the length of time it takes for carrier 125 to travel from location $175_1$ to location $175_2$ exceeds the length of time $t_{1,2}$, a timing violation occurs, and controller 160 will indicate a path-violation alarm when operating in the security-zone-monitoring mode. When the length of time it takes for carrier 125 to travel from location $175_2$ to location $175_2'$, when location $175_2'$ is included in segment $155_2$, exceeds the length of time $t_{2,2'}$, a timing violation occurs, and controller 160 will indicate a path-violation alarm when operating in the security-zone-monitoring mode. When the length of time it takes for carrier 125 to travel from location $175_2$ to location $175_3$, when location $175_2'$ is not included in segment $155_2$, exceeds the length of time $t_{2,3}$ or when the length of time it takes for carrier 125 to travel from location $175_2'$ to location $175_3$, when location $175_2'$ is included in segment $155_2$, exceeds the length of time $t_{2',3}$, a timing violation occurs, and controller 160 will indicate a path-violation alarm when operating in the security-zone-monitoring mode. When the length of time it takes for carrier 125 to travel from location $175_3$ to location $175_N$ exceeds the length of time $t_{3,N}$, a timing violation occurs, and controller 160 will indicate a path-violation alarm when operating in the security-zone-monitoring mode.

For one embodiment, indicating a path-violation alarm in response to a timing violation may include controller 160 displaying an indicator, e.g., on display 162, indicating that a path-violation alarm has occurred. The indicator may also indicate the date and time the path-violation alarm occurred and the last camera to capture the image of carrier 125 at a time just prior to or at the time of the path-violation alarm. For one embodiment, an indicator is displayed for each path-violation alarm that has occurred, e.g., as part of an alarm log.

For another embodiment, the date and time that each video frame for each camera was captured is added to the image data for that frame. Therefore, for one embodiment, a user may input the day and time of a path-violation alarm into a search engine of controller 160 and perform a global search of the image data files to locate the video for each camera that was taken, starting at the time of the path-violation alarm. For another embodiment, the time indicated by the indicator may be just prior to the time of the path-violation alarm to enable the retrieval of video that was taken just prior to the time of the path-violation alarm. For example, the global search may be based on a time just prior to the time of the path-violation alarm. For another embodiment, the user may display the video for each camera and fast-forward through the video until the frame corresponding to the date and time of the path-violation alarm appears.

For one embodiment, controller 160 may be configured to indicate a location within the database where video taken by each camera, starting at the time of the path-violation alarm or just prior to the time of the path-violation alarm, is stored. For example, in one embodiment, controller 160 may be configured to tag (e.g., bookmark) a location in the image data file, e.g. a specific frame, in response to a path-violation alarm, for each camera, corresponding to the time of the path-violation alarm. For example, controller 160 may be configured to add an identifier to the image data corresponding to the frame captured by each camera at the time of the path-violation alarm or a time just prior to the time of the path-violation alarm. In addition, the path-violation alarm indicated by controller 160 in response to the timing violation may include the identifier, so that the user can input the identifier into a global search of the image data files to locate the image data, for each camera, corresponding to the timing violation. In another embodiment, controller 160 may be configured to indicate, e.g., on display 162, each path-violation alarm and the location in storage device 170 of the image data recorded by each camera 150, starting at the time of the path-violation alarm or a time just prior to the time of the path-violation alarm.

For another embodiment, controller 160 may be configured to create, in response to a path-violation alarm, image data files specifically for storing video from each camera 150 that was activated, starting at the time of the path-violation alarm or a time just prior to the time of the path-violation alarm and ending at a certain time after the path-violation alarm, e.g., about a length of time it takes for carrier 125 to traverse the distance from the stockroom to location 120. Controller 160 may be further configured to indicate the names of these files in response to the path-violation alarm, e.g., in an alarm log.

Figure 2:
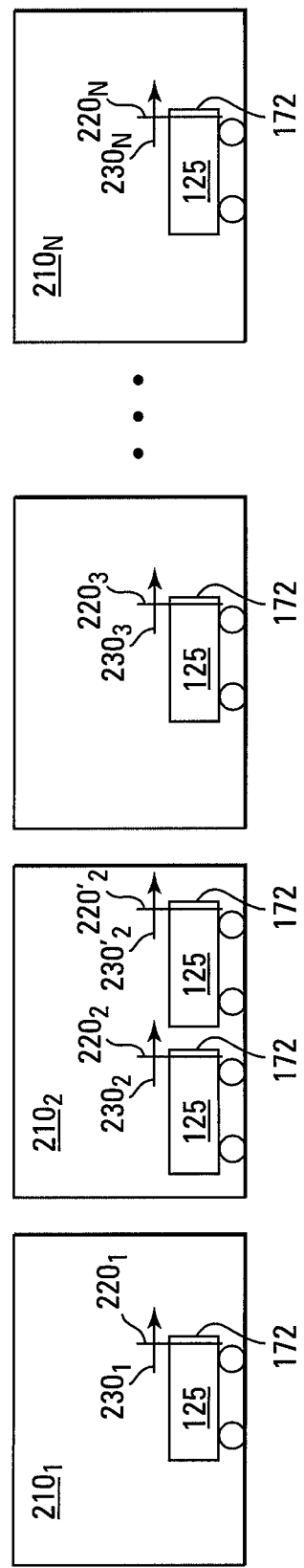
FIG. 2 illustrates image fields captured by cameras along a path within the facility of FIG. 1, according to another embodiment of the invention.

For one embodiment, controller 160 may be configured to place a marker (e.g., known as a "video tripwire") in the image field captured by each of cameras $150_1$ to $150_N$ that coincides with a respective one of each of locations $175_1$ to $175_N$ (FIG. 1). For example, FIG. 2 illustrates image fields $210_1$ to $210_N$ respectively captured by cameras $150_1$ to $150_N$. That is, image fields $210_1$ to $210_N$ respectively contain the images of segments $155_1$ to $155_N$ as respectively captured by cameras $150_1$ to $150_N$. Note that markers (e.g., "video tripwires") $220_1$ to $220_N$ are respectively located in image fields $210_1$ to $210_N$ and respectively coincide with locations $175_1$ to $175_N$ along path 135 for embodiments where segment $155_2$ does not include location $175_2'$. Note further that, markers $220_1$ and $220_N$ respectively coincide with starting location 122 and ending location 120 (FIG. 1). In an alternative embodiment, markers $220_1$ to $220_N$ respectively coincide with locations $175_1$ to $175_N$ and marker $220_2'$ is located in image field $210_2$ and coincides with location $175_2'$ for embodiments where segment $155_2$ includes location $175_2'$.

For embodiments where location $175_2'$ is not included in segment $155_2$, controller 160 determines the length of time it takes for carrier 125 to travel between successive locations 175 by measuring the time that elapses from when a portion of the image of carrier 125, e.g., a front end 172 (FIG. 2), crossed a marker 220 within the image field 210 that contains one of the successive locations 175 until the portion of the carrier crossed a marker 220 within the image field 210 that contains the next one of the successive locations 175. For example, at an instant of time when front end 172 crosses marker $220_1$ in image field $210_1$, as shown in FIG. 2, in a certain direction, e.g., in the direction of arrow $230_1$, controller 160 starts timing the travel of carrier 125 between locations $175_1$ and $175_2$. At the instant of time front end 172 crosses marker $220_2$ in image field $210_2$ in the direction of arrow $230_2$, controller 160 compares the time that elapsed from when front end 172 crossed marker $220_1$ until front end 172 crossed marker $220_2$, i.e., the travel time between locations $175_1$ and $175_2$, to the length of time $t_{1,2}$ and starts timing the travel of carrier 125 between locations $175_2$ and $175_3$ when the travel time between locations $175_1$ and $175_2$ is less than or equal to the length of time $t_{1,2}$. At the instant of time front end 172 crosses marker $220_3$ in image field $210_3$ in the direction of arrow $230_3$, controller 160 compares the time that elapsed from when front end 172 crossed marker $220_2$ until front end 172 crossed marker $220_3$, i.e., the travel time between locations $175_2$ and $175_3$, to the length of time $t_{2,3}$ and starts timing the travel of carrier 125 between locations $175_3$ and $175_N$ when the travel time between locations $175_2$ and $175_3$ is less than or equal to the length of time $t_{2,3}$. At the instant of time front end 172 crosses marker $220_N$ in image field $210_N$ in the direction of arrow $230_N$, controller 160 compares the time that elapsed from when front end 172 crossed marker $220_3$ until front end 172 crossed marker $220_N$, i.e., the travel time between locations $175_3$ and $175_N$, to the length of time $t_{3,N}$ and stops timing when the travel time between locations $175_3$ and $175_N$ is less than or equal to the length of time $t_{3,N}$. Note that controller 160 indicates a path-violation alarm, when operating in the security-zone-monitoring mode, when a travel time exceeds the certain time to which that travel time is compared, but keeps timing until carrier 125 reaches location 120 when each travel time is less than or equal to the respective one of the certain times to which that travel time is compared. For another embodiment, the monitoring system may return to the normal operating mode when carrier 160 arrives at location 120 without a timing violation.

For embodiments where timing occurs between locations within a single segment 155, such as between locations $175_2$ and $175_2'$ within segment $155_2$, the timing of carrier 125 may proceed as follows. At an instant of time when front end 172 crosses marker $220_1$ in the direction of arrow $230_1$, controller 160 starts timing the travel of carrier 125 between locations $175_1$ and $175_2$. At the instant of time front end 172 crosses marker $220_2$ in the direction of arrow $230_2$, controller 160 compares the time that elapsed from when front end 172 crossed marker $220_1$ until front end 172 crossed marker $220_2$, i.e., the travel time between locations $175_1$ and $175_2$, to the length of time $t_{1,2}$ and starts timing the travel of carrier 125 between locations $175_2$ and $175_2'$ when the travel time between locations $175_1$ and $175_2$ is less than or equal to the length of time $t_{1,2}$. At the instant of time front end 172 crosses marker $220_2'$ in image field $210_2$ in the direction of arrow $230_2'$, controller 160 compares the time that elapsed from when front end 172 crossed marker $220_2$ until front end 172 crossed marker $220_2'$, i.e., the travel time between locations $175_2$ and $175_2'$, to the length of time $t_{2,2'}$ and starts timing the travel of carrier 125 between locations $175_2'$ and $175_3$ when the travel time between locations $175_2$ and $175_2'$ is less than or equal to the length of time $t_{2,2'}$. At the instant of time front end 172 crosses marker $220_3$ in the direction of arrow $230_3$, controller 160 compares the time that elapsed from when front end 172 crossed marker $220_2'$ until front end 172 crossed marker $220_3$, i.e., the travel time between locations $175_2'$ and $175_3$, to the length of time $t_{2,3}$ and starts timing the travel of carrier 125 between locations $175_3$ and $175_N$ when the travel time between locations $175_2'$ and $175_3$ is less than or equal to the length of time $t_{2,3}$. At the instant of time front end 172 crosses marker $220_N$ in the direction of arrow $230_N$, controller 160 compares the time that elapsed from when front end 172 crossed marker $220_3$ until front end 172 crossed marker $220_N$, i.e., the travel time between locations $175_3$ and $175_N$, to the length of time $t_{3,N}$ and stops timing when the elapsed travel time between locations $175_3$ and $175_N$ is less than or equal to the length of time $t_{3,N}$. Note that controller 160 indicates a path-violation alarm when operating in the security-zone-monitoring mode when a travel time exceeds the certain time to which that travel time is compared, but keeps timing until carrier 125 reaches location 120 when each travel time is less than or equal to the respective one of the certain times to which that travel time is compared.

For one embodiment, controller 160 may be configured to determine whether carrier 125 travels between successive locations 175 by determining whether an image of carrier 125 appears crossing a marker within an image field corresponding to a location 175 within a certain time after crossing a marker in an image field corresponding to a preceding location 175. For example, for timing between locations $175_1$ and $175_2$, when the image of carrier 125 does not appear crossing marker $230_2$ within image field $210_2$ within the length of time $t_{1,2}$ after crossing marker $230_1$ within image field $210_1$, a timing violation occurs between locations $175_1$ and $175_2$. When the image of carrier 125 does appear crossing marker $230_2$ within the length of time $t_{1,2}$ after crossing marker $230_1$, there is no timing violation between locations $175_1$ and $175_2$, and controller 160 proceeds with timing carrier 125 between the next locations 175, e.g., between locations $175_2$ and $175_2'$, when location $175_2'$ is included in segment $155_2$, or between locations $175_2$ and $175_3$, when location $175_2'$ is not included in segment $155_2$. For example, when the image of carrier 125 does not appear crossing marker $230_2$ within image field $210_2$ within the length of time $t_{2,2'}$ after crossing marker $230_2$ or the image of carrier 125 does not appear crossing marker $230_3$ within image field $210_3$ within the length of time $t_{2,3}$ after crossing marker $230_2$, a timing violation occurs. When the image of carrier 125 does appear crossing marker $230_2'$ within the length of time $t_{2,2'}$ after crossing marker $230_2$ or crossing marker $230_3$ within the length of time $t_{2,3}$ after crossing marker $230_2$, there is no timing violation, and controller 160 proceeds with timing cart between the next locations 175 in a similar manner until a timing violation occurs or until carrier 125 reaches location $175_N$, which coincides with end location 120.

For one embodiment, controller 160 is configured to initiate the timing between locations $175_1$ and $175_2$ in response to the image of carrier 125 crossing the marker $220_1$ in image field $210_1$ captured by the camera $150_1$. For another embodiment, controller 160 is further configured to cause marker $220_2$ to be superimposed on image field $210_2$ captured by the camera $150_2$ in response to the image of carrier 125 crossing the marker $220_1$.

Controller 160 may be further configured to initiate the timing between locations $175_2$ and $175_2'$ in response to the image of carrier 125 crossing the marker $220_2$ in image field $210_2$, e.g., when the travel time of carrier 125 between locations $175_1$ and $175_2$ is less than or equal to the length of time $t_{1,2}$. For another embodiment, controller 160 may be further configured to cause marker $220_2$ to be superimposed on image field $210_2$ in response to the image of carrier 125 crossing the marker $220_2$ when the travel time of carrier 125 between locations $175_1$ and $175_2$ is less than or equal to the length of time $t_{1,2}$. For yet another embodiment, controller 160 may cause both marker $220_2$ and marker $220_2'$ to be superimposed on image field $210_2$ in response to the image of carrier 125 crossing the marker $220_1$.

Alternatively, when location $175_2'$ is not included in segment $155_2$, controller 160 may be further configured to initiate the timing between locations $175_2$ and $175_3$ in response to the image of carrier 125 crossing the marker $220_2$ in image field $210_2$ when the travel time of carrier 125 between locations $175_1$ and $175_2$ is less than or equal to the length of time $t_{1,2}$. For another embodiment, controller 160 may be further configured to cause marker $220_3$ to be superimposed on image field $210_2$ in response to the image of carrier 125 crossing the marker $220_2$ when the travel time of carrier 125 between locations $175_1$ and $175_2$ is less than or equal to the length of time $t_{1,2}$.

For one embodiment, controller 160 may transition from the timing mode of operation to the security-zone-monitoring mode of operation in response to the travel time of carrier 125 between locations $175_2$ and $175_2'$ being less than or equal to the length of time $t_{2,2'}$, when location $175_2'$ is included in segment $155_2$, or in response to the travel time of carrier 125 between locations $175_2$ and $175_3$ being less than or equal to the length of time $t_{2,3}$, when location $175_2'$ is not included in segment $155_2$. For one embodiment, controller 160, and thus the monitoring system, may be configured to operate the security-zone-monitoring mode of operation from the time when controller 160 detects the image of carrier 125 crossing the marker $220_1$ in image field $210_1$, or controller 160 may be configured to transition from the timing mode of operation to the security-zone-monitoring mode of operation in response to the travel time of carrier 125 between locations $175_2$ and $175_2'$ being less than or equal to the length of time $t_{2,2'}$, when location $175_2'$ is included in segment $155_2$, or in response to the travel time of carrier 125 between locations $175_2$ and $175_3$ being less than or equal to the length of time $t_{2,3}$, when location $175_2'$ is not included in segment $155_2$. For example, controller 160 may transition from the timing mode of operation to the security-zone-monitoring mode of operation when image carrier 125 reaches location $175_2'$ from location $175_1$, when location $175_2'$ is included in segment $155_2$, without any timing violations, as determined from the image of carrier 125 crossing marker $220_2'$ in the direction of arrow $230_2'$ in image field $210_2$ (FIG. 2). Alternatively, controller 160 may transition from the timing mode of operation to the security-zone-monitoring mode of operation when image carrier 125 reaches location $175_3$ from location $175_1$, when location $175_2'$ is not included in segment $155_2$, without any timing violations, as determined from the image of carrier 125 crossing marker $220_3$ in the direction of arrow $230_3$ in image field $210_3$ (FIG. 2).

For the embodiment where location $175_2'$ is included in segment $155_2$, controller 160 may be further configured to initiate the timing between locations $175_2'$ and $175_3$ in response to the image of carrier 125 crossing the marker $220_2'$, e.g., when the travel time of carrier 125 between locations $175_2$ and $175_2'$ is less than or equal to the length of time $t_{2,2'}$. For another embodiment, controller 160 may be further configured to cause marker $220_3$ to be superimposed on image field $210_3$ in response to the image of carrier 125 crossing the marker $220_2'$ when the travel time of carrier 125 between locations $175_2$ and $175_2'$ is less than or equal to the length of time $t_{2,2'}$. Controller 160 may be further configured to initiate the timing between locations $175_3$ and $175_N$ in response to the image of carrier 125 crossing the marker $220_3$, e.g., when the travel time of carrier 125 between locations $175_2'$ and $175_3$ is less than or equal to the length of time $t_{2',3}$. For another embodiment, controller 160 may be further configured to cause marker $220_N$ to be superimposed on image field $210_N$ in response to the image of carrier 125 crossing the marker $220_3$ when the travel time of carrier 125 between locations $175_2'$ and $175_3$ is less than or equal to the length of time $t_{2',3}$.

For the embodiment where location $175_2'$ is not included in segment $155_2$, controller 160 may be configured to initiate the timing between locations $175_3$ and $175_N$ in response to the image of carrier 125 crossing the marker $220_3$, e.g., when the travel time of carrier 125 between locations $175_2$ and $175_3$ is less than or equal to the length of time $t_{2,3}$. For another embodiment, controller 160 may be further configured to cause marker $220_N$ to be superimposed on image field $210_N$ in response to the image of carrier 125 crossing the marker $220_3$ when the travel time of carrier 125 between locations $175_2$ and $175_3$ is less than or equal to the length of time $t_{2,3}$.

In an alternative embodiment, the timing commences in response to determining that the image of carrier 125 captured by camera $150_1$ has left the image field (e.g., image field $210_1$) captured by camera $150_1$, using the methods described above. For example, when an image of an object, corresponding to carrier 125, of a certain size has been absent from image field $210_1$ for a certain time, e.g., about five seconds, camera $150_2$ is activated, and the timing of carrier 125 from starting location 122 captured by camera $150_1$ to location $175_2$ within segment $155_2$ captured by camera $150_2$ occurs by determining the elapsed time from when the image of carrier 125 was last present in image field $210_1$ until when the image of carrier 125 crosses marker $220_2$ in image field $210_2$. For another embodiment, marker $220_2$ is displayed in image field $210_2$ in response to determining that the image of carrier 125 has left image field $210_1$. It should be understood that the certain times for travel of carrier 125 between respective locations may vary from location to location and from facility to facility.

Figure 3:
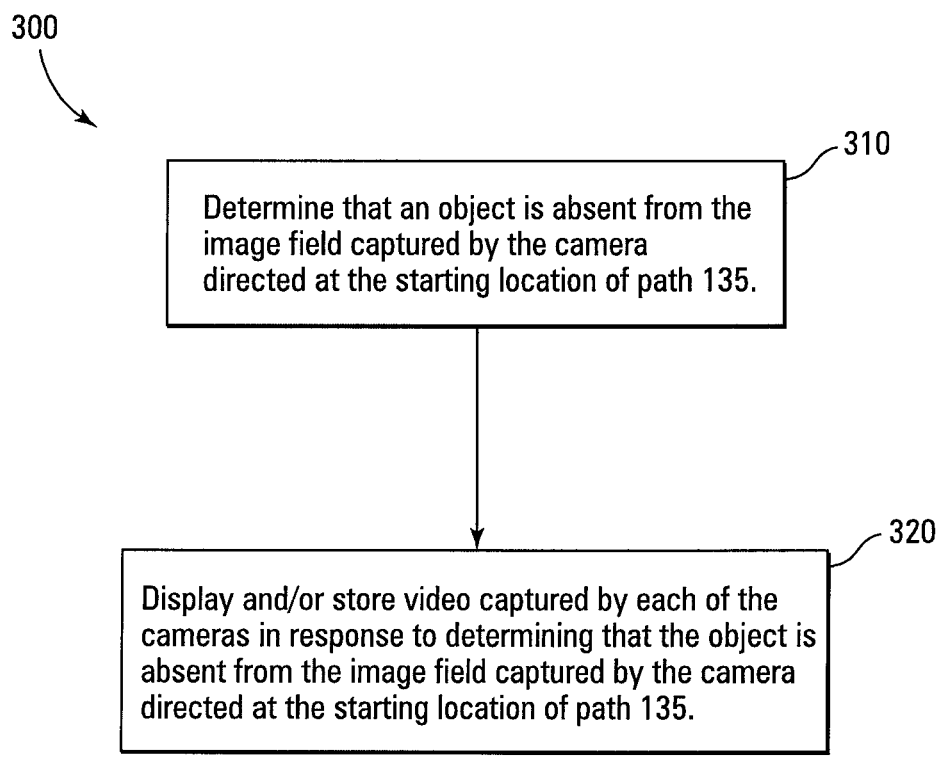
FIG. 3 is a flowchart of an embodiment of a method, according to another embodiment of the invention.

FIG. 3 is a flowchart of a method 300 of monitoring a path, such as path 135, of a facility, such as retail store 100, using a plurality of cameras, such as cameras $150_1$ to $150_N$, directed at the path, according to another embodiment. At block 310, it is determined that an object, e.g., corresponding to carrier 125, is absent from the image field captured by the camera directed at the starting location, e.g., location 122, of path 135. For one embodiment, this involves determining that the object has a certain size and has been absent from that image field for a certain time, as described above. For a further embodiment, upon determining that the object is absent from image field $210_1$ (FIG. 2) captured by camera $150_1$ directed at location 122 (FIG. 1) of path 135, controller 160 determines that carrier 125 is absent from the image field $210_1$, and thus that carrier 125 has left location 122.

At block 320, the video captured by each of the cameras, e.g., each of cameras $150_1$ to $150_N$, is displayed and/or stored in response to determining that the object is absent from the image field captured by the camera directed at the starting location of path 135. For example, the video captured by each of cameras $150_1$ to $150_N$ may be stored in storage device 170 and/or displayed on video monitors $166_1$ to $166_N$ (FIG. 1) or on video display 162. For one embodiment, the video captured by each of the plurality of cameras is displayed and/or stored at only certain times of day, e.g., when retail store 100 is closed, for stocking location 120 with items contained in carrier 125.

Figure 4:
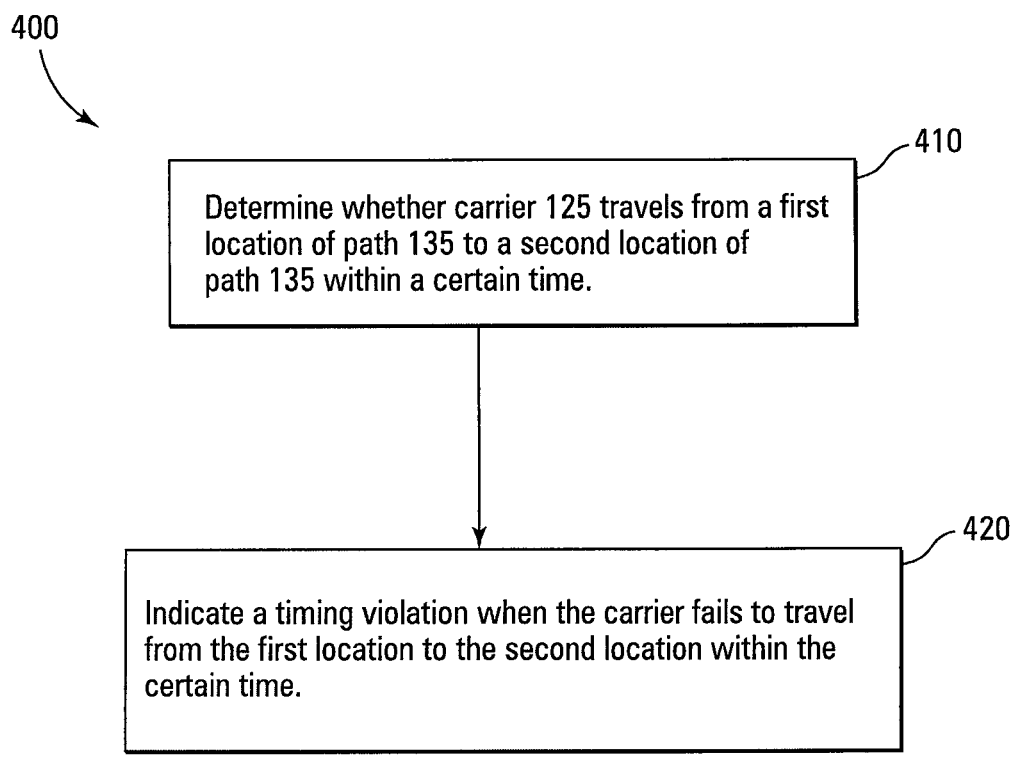
FIG. 4 is a flowchart of an embodiment of a method, according to another embodiment of the invention.

FIG. 4 is a flowchart of a method 400 of monitoring a path, such as path 135, of a facility, such as retail store 100, according to another embodiment. At block 410, it is determined whether carrier 125 travels from a first location of the path 135 to a second location of path 135 within a certain time. For example, it is determined whether carrier 125 travels from any one of locations 175 to the next location 175 (FIG. 1) within a certain time. For one embodiment, determining whether carrier 125 travels from a first location 175 to a second location 175 (FIG. 1) within the certain time involves determining whether an image of carrier 125 crosses a marker 220 on an image field 210 (FIG. 2) captured by a camera 150 directed at the second location 175 within the certain time after determining that the image of carrier 125 moves past a marker 220 on an image field 210 captured by a camera directed at the first location 175. For another embodiment, before determining whether the carrier travels from the first location 175 to the second location 175 within the certain time, the marker 220 is superimposed on the image field 210 captured by the camera 150 directed at the second location in response to determining that the image of carrier 125 moves past the marker 220 on the image field 210 captured by the camera 150 directed at the first location of the path. For another embodiment, the camera 150 directed at the second location of the path and the camera directed at the first location of the path is a single camera, such as camera $150_2$, as shown in FIG. 1.

At block 420 a timing violation is indicated when carrier 125 fails to travel from the first location to the second location within the certain time. For one embodiment, an alarm is indicated in conjunction with indicating the timing violation, e.g., when controller 160, and thus the monitoring system, is operating in the security-zone-monitoring mode.

For another embodiment, when carrier 125 travels from the first location of the path to the second location of the path within a first time, it is determined whether carrier 125 travels from the second location of the path to a third location of the path within a second time. For another embodiment, the third location is the ending location 120 of path 135, and the timing of carrier 125 is stopped when carrier 125 travels from the second location to the third location within the second time, e.g., controller 160 returns to the normal operating mode from the security-zone-monitoring mode in response to carrier 125 reaching location 120 without incurring any time violations.

CONCLUSION

Although specific embodiments have been illustrated and described herein it is manifestly intended that the scope of the claimed subject matter be limited only by the following claims and equivalents thereof.

What is claimed is:

1. A method of monitoring a path of a facility using a plurality of cameras directed at the path, the method comprising:
   determining that an object is absent from an image field captured by a camera of the plurality of cameras that is directed at a starting location of the path at least in part by using a controller having at least one electronic component to analyze data from the camera of the plurality of cameras that is directed at a starting location of the path; and
   displaying and/or storing video captured by each of the plurality of cameras in response to said controller determining that the object is absent from the image field captured by the camera directed at the starting location of the path.

2. The method of claim 1, wherein determining that the object is absent from the image field captured by the camera directed at the starting location of the path comprises determining that the object has a certain size and has been absent from that image field for a certain time.

3. The method of claim 1, further comprising determining that a carrier has left the starting location of the path upon determining that the object is absent from the image field captured by the camera directed at the starting location of the path.

\* \* \* \* \*